US008671121B2

(12) United States Patent
Halberstadt et al.

(10) Patent No.: US 8,671,121 B2
(45) Date of Patent: Mar. 11, 2014

(54) MODEL AUGMENTATION IN A MODEL-DRIVEN APPLICATION DEVELOPMENT ENVIRONMENT

(75) Inventors: Benjamin Halberstadt, Jerusalem (IL); Eliezer Israel, Bat Ayin (IL); Boris Melamed, Jerusalem (IL); Guy Yitzhaki, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/945,046

(22) Filed: Nov. 26, 2007

(65) Prior Publication Data

US 2009/0138436 A1    May 28, 2009

(51) Int. Cl.
*G06F 17/30* (2006.01)
(52) U.S. Cl.
USPC ................. 707/804; 707/807; 707/999.101
(58) Field of Classification Search
USPC ............. 707/804, 806, 808, 999.1, 807, 707, 707/802, 810, 999.101, 999.102
See application file for complete search history.

(56) References Cited

U.S. PATENT DOCUMENTS

| | | | |
|---|---|---|---|
| 6,772,393 B1 | 8/2004 | Estrada et al. | |
| 7,000,219 B2 | 2/2006 | Barrett et al. | |
| 8,185,897 B2* | 5/2012 | Kushwaha | 718/100 |
| 8,417,715 B1* | 4/2013 | Bruckhaus et al. | 707/758 |
| 2003/0097545 A1 | 5/2003 | Vadavia | |
| 2004/0015542 A1 | 1/2004 | Anonsen et al. | |
| 2004/0181538 A1* | 9/2004 | Lo et al. | 707/100 |
| 2006/0136865 A1 | 6/2006 | Lin et al. | |
| 2008/0046456 A1 | 2/2008 | Hejlsberg et al. | |

FOREIGN PATENT DOCUMENTS

EP    1577755 A2    9/2005

OTHER PUBLICATIONS

Estrella et al., "Meta-Data Objects as the Basis for System Evolution", (Source: http./inorbert.home.cern.ch/norbert/PhD/PaperPress/waim01.pdf ).
Englebert et al., "Attribute-Based Refinement of Software Architectures" http://citeseer.ist.psu.edu/rd/60633617%2C722286%2C1%2C0.25%2CDownload/http://cites.eer.ist.psu.edu/cache/papers/cs2/450/http:zSzzSzwww.info.fundp.ac.bezSz~fvezSzpaperosizSzengleberty_attribute.pdf/attribute-based-refinement-of.pdf.
United States Patent and Trademark Office, Notice of Allowance for U.S. Appl. No. 13/286,655, Jun. 27, 2012, pp. 1-16, Alexandria, VA, USA.
R. Heckel, et al, Relating functional requirements and software architecture: separation and consistency of concerns, Journal of Software Maintenance and Evolution Research and Practice, Sep.-Oct. 2002, pp. 371-388, vol. 14, No. 5, John Wiley & Sons, Ltd.

(Continued)

*Primary Examiner* — Marc Filipczyk
(74) *Attorney, Agent, or Firm* — Lee Law, PLLC; Christopher B. Lee

(57) ABSTRACT

Augmenting a model in a model-driven application development architecture, including defining a task to be performed on at least one model item of a principal model, where the principal model is configured to facilitate the automatic generation of at least one resource for use by a computer-executable application, identifying at least one model item required for use the task that is absent from the principal model, defining the absent model item in a decoration model, mapping the decoration model to the principal model, and storing both of the models on a computer-readable medium.

20 Claims, 11 Drawing Sheets

(56) References Cited

OTHER PUBLICATIONS

G. Voulalas, et al., A framework for the development and deployment of evolving applications: elaborating on the model driven architecture towards a change-resistant development framework, ICSOFT 2006, Proceedings of the First International Conference on Software and Data Technologies, 2006, p. 1 (Abstract only),The Institute for Systems and Technologies of Information, Control and Communication (INSTICC).

United States Patent and Trademark Office, Office Action for U.S. Appl. No. 11/945,015, Apr. 4, 2011, pp. 1-10, Alexandria, VA, USA.

United States Patent and Trademark Office, Notice of Allowance for U.S. Appl. No. 11/945,015, Sep. 8, 2011, pp. 1-9, Alexandria, VA, USA.

United States Patent and Trademark Office, Office Action for U.S. Appl. No. 13/286,655, Feb. 6, 2012, pp. 1-14, Alexandria, VA, USA.

United States Patent and Trademark Office, Office Action for U.S. Appl. No. 13/605,217, Jun. 4, 2013, pp. 1-15, Alexandria, VA, USA.

United States Patent and Trademark Office, Notice of Allowance for U.S. Appl. No. 13/605,217, Sep. 13, 2013, pp. 1-12, Alexandria, VA, USA.

* cited by examiner

MODEL AUGMENTATION IN A MODEL-DRIVEN APPLICATION DEVELOPMENT ENVIRONMENT

RELATED

Commonly-owned and co-pending U.S. patent application having Ser. No. 11/945,015 (filed concurrently herewith), titled "Decorated Model Architecture for Efficient Model-Driven Application Development."

FIELD OF THE INVENTION

The present invention relates to model-driven application development.

BACKGROUND OF THE INVENTION

With the advent of modeling methodologies such as the Unified Modeling Language (UML), developers of computer-based applications have been able to create system models and then employ tools that use the models to automatically generate application resources such as application programming interface (API) software for creating, accessing and modifying instances of model classes, as well as aspects of the persistence layer of an application, such as database structures. While it may be preferable from the point of view of those that work with models or perform analyses on models that models should be constructed in a way that makes them easy to understand and work with, models are often optimized for better system performance and other implementation considerations, resulting in models that are difficult to understand and work with.

SUMMARY OF THE INVENTION

The present invention provides a decorated model architecture supporting model augmentation in a model-driven application development environment.

In one aspect of the present invention a method is provided for augmenting a model in a model-driven application development architecture, the method including defining a task to be performed on at least one model item of a principal model, where the principal model is configured to facilitate the automatic generation of at least one resource for use by a computer-executable application, identifying at least one model item required for the task that is absent from the principal model, defining the absent model item in a decoration model, mapping the decoration model to the principal model, and storing both of the models on a computer-readable medium.

In another aspect of the present invention the identifying step includes identifying at least one class in the principal model that can be subdivided into one or more subclasses, identifying in the class an attribute that distinguishes the identities of each of the subclasses, and declaring a lookup table mapping values of the attribute to the identities of the subclasses.

In another aspect of the present invention the method further includes identifying a flattened class hierarchy in the principal model where all subclasses of any classes in the flattened class hierarchy are stored in a single table using a "type" discriminator attribute, and representing any of the classes in a static class model in the decoration model where the subtype information of any of the classes is explicitly represented by separate subclasses in the decoration model.

In another aspect of the present invention the method further includes performing a look-up of derived subclasses in the decoration model by using a primitive attribute value where more than one attribute is involved in determining a derived subclass.

In another aspect of the present invention the method further includes providing read access for a query that is formatted for use with the decoration model and that is not directly operative on the principal mode by translating the query for operation on an instance of the principal model.

In another aspect of the present invention the method further includes providing read access for a query that is formatted for use with at least one class of the principal model, where the query yields information that resides in both the principal model and the decoration model.

In another aspect of the present invention the method further includes setting values of instances of any of classes, references, or attributes of the decoration model by translating the values for storage in the principal model, where the values retain their meaning when the instances are subsequently retrieved via the decoration model.

In another aspect of the present invention the method further includes providing write access for an object that is created via the decoration layer and whose class is a derived subclass, by setting then the "type" attribute value according to the subclass lookup value, where the type attribute value is persisted with persistent schema of the principal model such that when the object is subsequently accessed, the object is assigned to an appropriate derived subclass.

In another aspect of the present invention the method further includes identifying at least two classes in the principal model where an association between the classes is not expressed using an association model item, and representing the association in the decoration model.

In another aspect of the present invention the representing step includes creating a reference associated with a key which contains information about a source attribute and a target attribute of the key in the decoration model.

In another aspect of the present invention the method further includes providing read access responsive to a request for the value of a derived reference in the decoration model, where an object that is implicitly referenced by the key is returned.

In another aspect of the present invention the method further includes providing write access responsive to a request to set a value for a derived reference in the decoration model, where the source key attribute of a source object is set to the target key attribute value of a target object.

In another aspect of the present invention the method further includes saving the source object in a persistence layer including the set key attribute value, where the target object will be retrieved when the source object is subsequently accessed.

In another aspect of the present invention a system is provided for augmenting a model in a model-driven application development architecture, the system including a model builder configured to facilitate the defining of a task to be performed on at least one model item of a principal model, where the principal model is configured to facilitate the automatic generation of at least one resource for use by a computer-executable application, identifying of at least one model item required for the task that is absent from the principal model, defining of the absent model item in a decoration model, mapping of the decoration model to the principal model, and means for storing both of the models on a computer-readable medium.

In another aspect of the present invention the model builder is configured to facilitate identifying at least one class in the principal model that can be subdivided into one or more subclasses, identifying in the class an attribute that distinguishes the identities of each of the subclasses, and declaring a lookup table mapping values of the attribute to the identities of the subclasses.

In another aspect of the present invention the model builder is configured to facilitate identifying a flattened class hierarchy in the principal model where all subclasses of any classes in the flattened class hierarchy are stored in a single table using a "type" discriminator attribute, and representing any of the classes in a static class model in the decoration model where the subtype information of any of the classes is explicitly represented by separate subclasses in the decoration model.

In another aspect of the present invention the model builder is configured to facilitate performing a look-up of derived subclasses in the decoration model by using a primitive attribute value where more than one attribute is involved in determining a derived subclass.

In another aspect of the present invention the model builder is configured to facilitate providing read access for a query that is formatted for use with the decoration model and that is not directly operative on the principal mode by translating the query for operation on an instance of the principal model.

In another aspect of the present invention the model builder is configured to facilitate providing read access for a query that is formatted for use with at least one class of the principal model, where the query yields information that resides in both the principal model and the decoration model.

In another aspect of the present invention the model builder is configured to facilitate setting values of instances of any of classes, references, or attributes of the decoration model by translating the values for storage in the principal model, where the values retain their meaning when the instances are subsequently retrieved via the decoration model.

In another aspect of the present invention the model builder is configured to facilitate providing write access for an object that is created via the decoration layer and whose class is a derived subclass, by setting then the "type" attribute value according to the subclass lookup value, where the type attribute value is persisted with persistent schema of the principal model such that when the object is subsequently accessed, the object is assigned to an appropriate derived subclass.

In another aspect of the present invention the model builder is configured to facilitate identifying at least two classes in the principal model where an association between the classes is not expressed using an association model item, and representing the association in the decoration model.

In another aspect of the present invention the model builder is configured to facilitate creating a reference associated with a key which contains information about a source attribute and a target attribute of the key in the decoration model.

In another aspect of the present invention the model builder is configured to facilitate providing read access responsive to a request for the value of a derived reference in the decoration model, where an object that is implicitly referenced by the key is returned.

In another aspect of the present invention the model builder is configured to facilitate providing write access responsive to a request to set a value for a derived reference in the decoration model, where the source key attribute of a source object is set to the target key attribute value of a target object.

In another aspect of the present invention the model builder is configured to facilitate saving the source object in a persistence layer including the set key attribute value, where the target object will be retrieved when the source object is subsequently accessed.

In another aspect of the present invention a computer program is provided embodied on a computer-readable medium, the computer program including a first code segment operative to define a task to be performed on at least one model item of a principal model, where the principal model is configured to facilitate the automatic generation of at least one resource for use by a computer-executable application, a second code segment operative to identify at least one model item required for the task that is absent from the principal model, a third code segment operative to define the absent model item in a decoration model, a fourth code segment operative to map the decoration model to the principal model, and a fifth code segment operative to store both of the models on a computer-readable medium.

In another aspect of the present invention the second code segment is configured for identifying at least one class in the principal model that can be subdivided into one or more subclasses, identifying in the class an attribute that distinguishes the identities of each of the subclasses, and declaring a lookup table mapping values of the attribute to the identities of the subclasses.

In another aspect of the present invention the computer program further includes a sixth code segment operative to identify a flattened class hierarchy in the principal model where all subclasses of any classes in the flattened class hierarchy are stored in a single table using a "type" discriminator attribute, and a seventh code segment operative to represent any of the classes in a static class model in the decoration model where the subtype information of any of the classes is explicitly represented by separate subclasses in the decoration model.

In another aspect of the present invention the computer program further includes an eighth code segment operative to perform a look-up of derived subclasses in the decoration model by using a primitive attribute value where more than one attribute is involved in determining a derived subclass.

In another aspect of the present invention the computer program further includes an eighth code segment operative to provide read access for a query that is formatted for use with the decoration model and that is not directly operative on the principal mode by translating the query for operation on an instance of the principal model.

In another aspect of the present invention the computer program further includes an eighth code segment operative to provide read access for a query that is formatted for use with at least one class of the principal model, where the query yields information that resides in both the principal model and the decoration model.

In another aspect of the present invention the computer program further includes an eighth code segment operative to set values of instances of any of classes, references, or attributes of the decoration model by translating the values for storage in the principal model, where the values retain their meaning when the instances are subsequently retrieved via the decoration model.

In another aspect of the present invention the computer program further includes an eighth code segment operative to provide write access for an object that is created via the decoration layer and whose class is a derived subclass, by setting then the "type" attribute value according to the subclass lookup value, where the type attribute value is persisted with persistent schema of the principal model such that when the object is subsequently accessed, the object is assigned to an appropriate derived subclass.

In another aspect of the present invention the computer program further includes a sixth code segment operative to identify at least two classes in the principal model where an association between the classes is not expressed using an association model item, and a seventh code segment operative to represent the association in the decoration model.

In another aspect of the present invention the seventh code segment is configured for creating a reference associated with a key which contains information about a source attribute and a target attribute of the key in the decoration model.

In another aspect of the present invention the computer program further includes an eighth code segment operative to provide read access responsive to a request for the value of a derived reference in the decoration model, where an object that is implicitly referenced by the key is returned.

In another aspect of the present invention the computer program further includes an eighth code segment operative to provide write access responsive to a request to set a value for a derived reference in the decoration model, where the source key attribute of a source object is set to the target key attribute value of a target object.

In another aspect of the present invention the computer program further includes a ninth code segment operative to save the source object in a persistence layer including the set key attribute value, where the target object will be retrieved when the source object is subsequently accessed.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
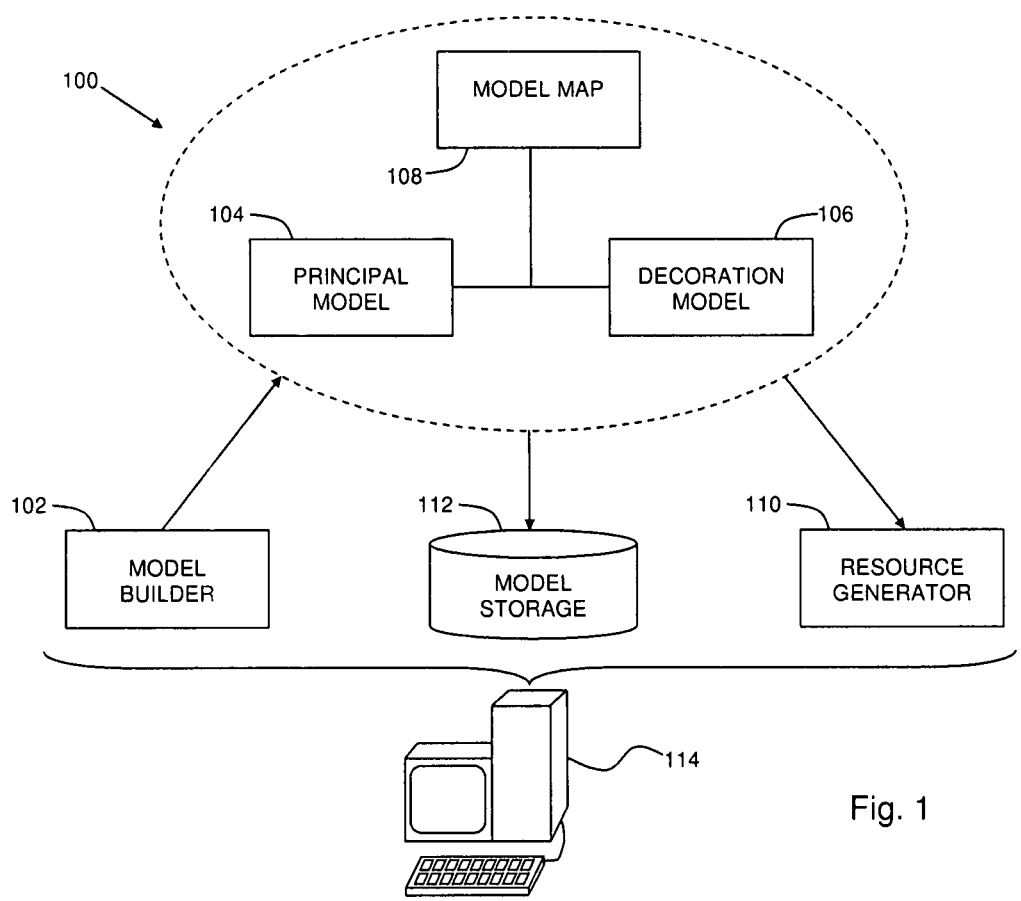
FIG. 1 is a simplified conceptual illustration of system for model-driven application development, constructed and operative in accordance with an embodiment of the present invention.

Reference is now made to FIG. 1 which is a simplified conceptual illustration of system for model-driven application development, constructed and operative in accordance with an embodiment of the present invention. In the system of FIG. 1, a model, generally designated 100 and bounded by dashed lines, is shown. Model 100 is typically constructed using a model builder 102 employing any known modeling technology, such as the Unified Modeling Language (UML), that supports classes, such as of an enterprise IT infrastructure or other system, and associations between the classes. Model 100 is configured to facilitate the automatic generation of one or more resources, such as by a resource generator 110, for use by one or more computer-executable applications. Such resources may be associated with what is referred to in modeling as the persistence layer, which includes schema elements including tables, columns, foreign keys, and indexes, or may be associated with the API, as is known in the art. Model 100 is divided into a principal model 104, a decoration model 106, and a model map 108 that maps between principal model 104 and decoration model 106. Principal model 104 is configured to include anything that, when added to, deleted from, or modified within principal model 104 subsequent to automatically generating the resources, would again require the automatic generation of the resources in order to effect the change for use by an application. Conversely, decoration model 106 is configured to include anything that, when added to, deleted from, or modified within decoration model 106 subsequent to automatically generating the resources, would not require the automatic generation of the resources in order to effect the change for use by an application.

Model 100 is preferably stored in a model storage 112, which may be computer memory, magnetic storage, or any other suitable information storage medium. Model 100 may be stored in storage 112 in any suitable format, such as in a relational database (RDB) or object-oriented database (OODB). Any of the elements shown in FIG. 1 are preferably executed by or otherwise accessible to a computer 114.

Principal model 104 preferably includes elements for storing decoration model 106, such as a via "DecorationModel" class representing a package of the items in decoration model 106. There is preferably one model partition per package, and each decoration model is preferably serialized, such as an XML document.

Figure 2:
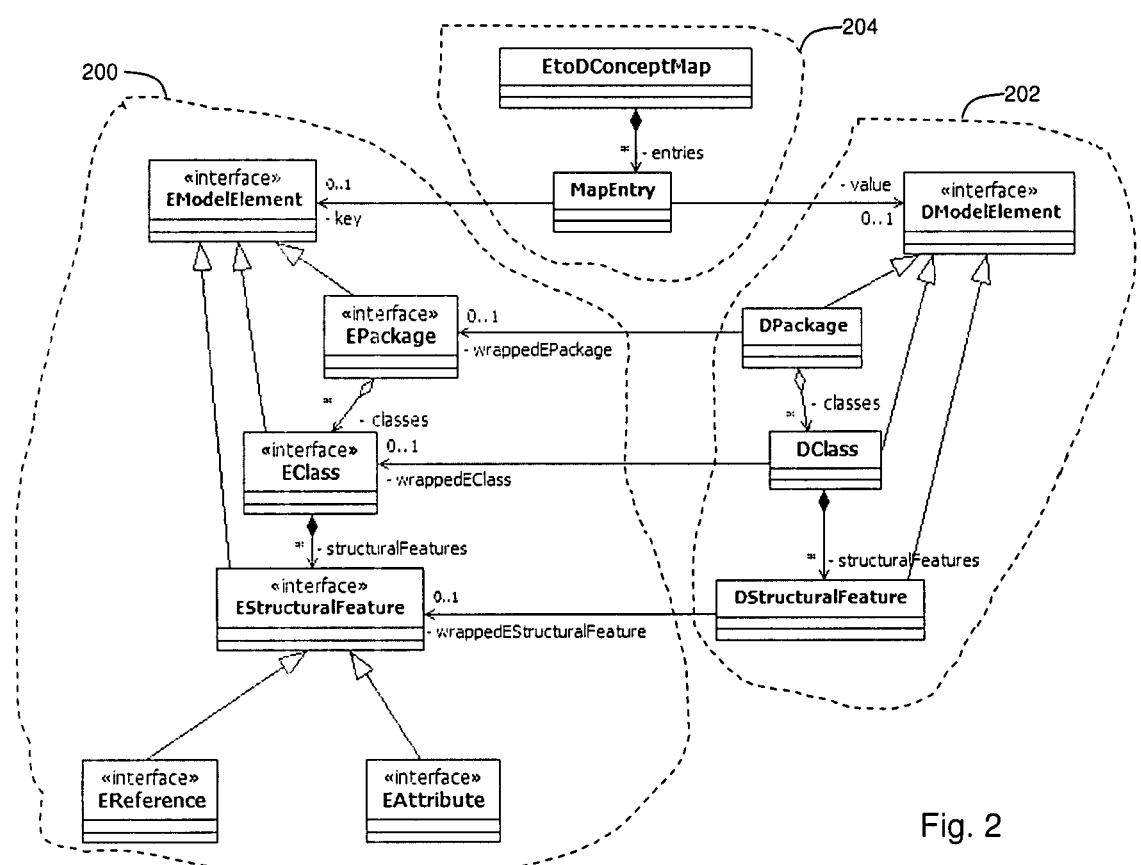
FIG. 2, which is a simplified illustration of an exemplary implementation of model 100 of FIG. 1, constructed and operative in accordance with an embodiment of the present invention.

Reference is now made to FIG. 2, which is a simplified illustration of an exemplary implementation of model 100 of FIG. 1, constructed and operative in accordance with an embodiment of the present invention. In FIG. 2, a principal model 200 is shown having various modeled items. A corresponding item is created in a decoration model 202 for one or more of the items in principal model 200. One or more items may then be attached to any of the items in decoration model 202, rather than in principal model 200, where their addition to, modification in, and/or subsequent deletion from decoration model 202 will not require that resources that were previously automatically generated using principal model 200 be subsequently regenerated due to the addition, modification, and/or deletion. Direct association links are preferably used for navigating from items in decoration model 202 to items in principal model 200, whereas a model map 206 is preferably used for navigating in the opposite direction.

Figure 3:
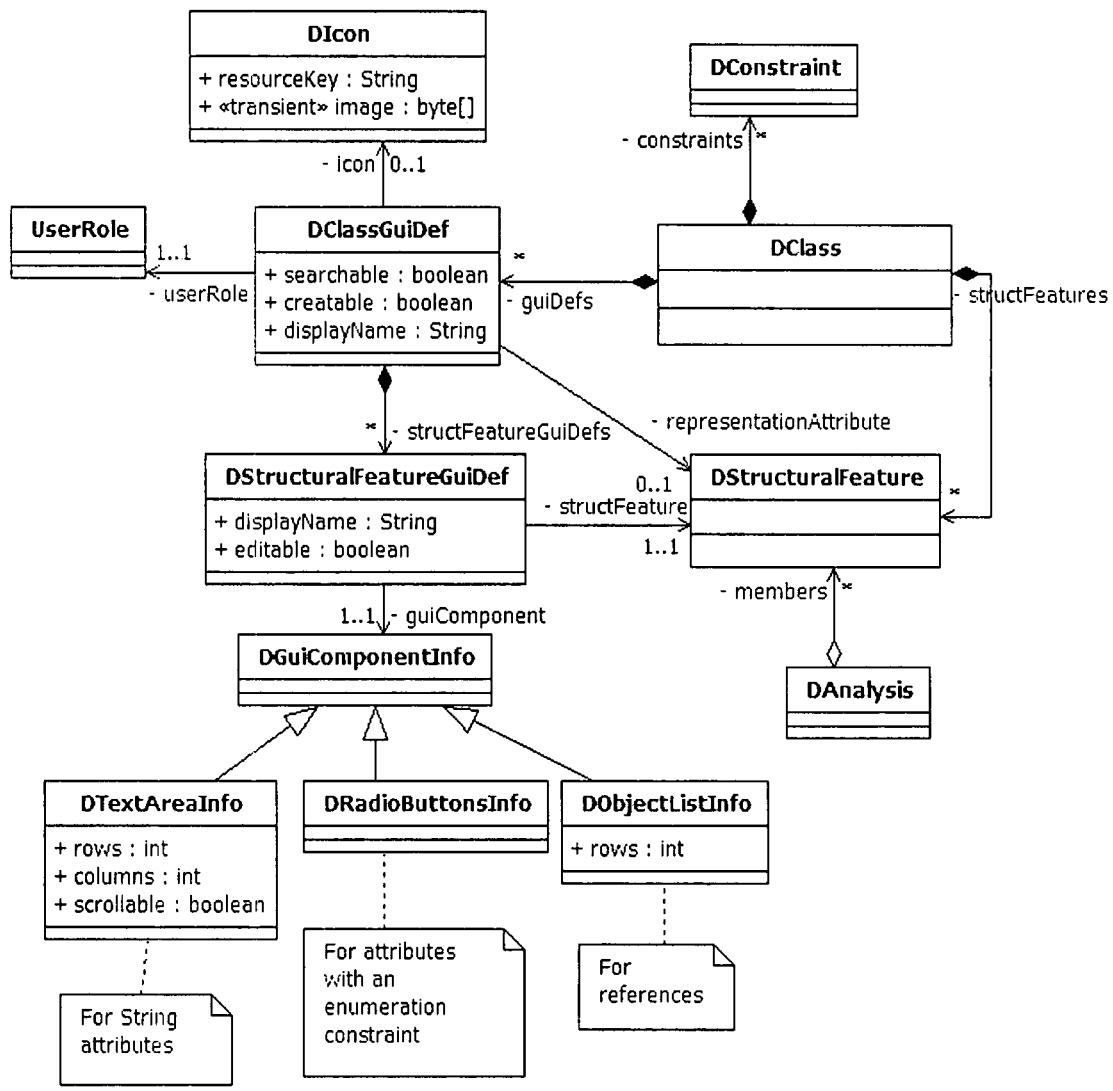
FIG. 3, which is a simplified illustration of an exemplary implementation of decoration model 106 of FIG. 1, constructed and operative in accordance with an embodiment of the present invention.

Reference is now made to FIG. 3, which is a simplified illustration of an exemplary implementation of decoration model 106 of FIG. 1, constructed and operative in accordance with an embodiment of the present invention. In FIG. 3 a decoration model is shown for aspects of a GUI interface in which classes and associations/attributes are decorated by detailed GUI presentation definitions, such as where there is one per user role, application/service-level constraints, and analysis logic definitions. For the sake of clarity, DPackage and DPackageGuiDef are not shown. DClass and DStructuralFeature are shown having been generated for each corresponding EClass/EStructuralFeature of a corresponding principal model. Instantiation of various concepts may be optional in a given decoration model, such as where a DClass has no DClassGuiDef for a certain UserRole and will therefore be invisible in the GUI layer for a user with that role.

Items in the decoration model of FIG. 3 may be created, edited and deleted without affecting a related principal model and without requiring regeneration of resources defined by the principal model. For example, a user may set a different display name for a class or attribute in the decoration model, although DClass and DStructuralFeature items in the decoration model that correspond to EClass/EStructuralFeature items in the principal model ought not be deleted.

The following guidelines may be employed when deciding what model items should be included in a principal model and what model items should be included in a decoration model. Model items that generally have, and should have, impact on resources that are generated based on a model should be included in a principal model, whereas model items that generally do not, or should not, have impact on resources that are generated based on a model should be included in a decoration model. Model builder 102 (FIG. 1) may be configured to recognize model items that do not impact generated resources and automatically place such items into a decoration model. These guidelines may be understood by way of example with regard to the persistence layer of an application environment in which database schema and an O/R mapping are generated using a model. In this example, model items that do not impact the generation of these resources include annotations that control display and business logic, and thus these items may be included within a decoration model. Model items that do impact the generation of these resources include classes, references, attributes, and annotations that control aspects of the persistence layer, such as indexes. Some model items may be included within a decoration model although they would otherwise impact resource generation, such as classes, references and attributes whose instances or values can be derived from other data. Thus, for example, where the attribute Person.fullName can be derived from Person.firstName and Person.lastName, the derived attribute may be included within a principal model, such as where the attribute values for Person.fullName are meant to be stored in a database. The responsibility to insert and update the values for Person.fullName would lie with the applications that populate Person data. Although including Person.fullName in a principal model may be convenient for authors of reporting applications, doing so results in data redundancy, performance costs owing to insertion time and table size, as well as the need to regenerate the schema and upgrade instances when the name or type of Person.fullName is changed. Alternatively, by placing Person.fullName in a decoration model, the responsibility for calculating the values for Person.fullName lies with applications that retrieve Person data.

Figure 4:
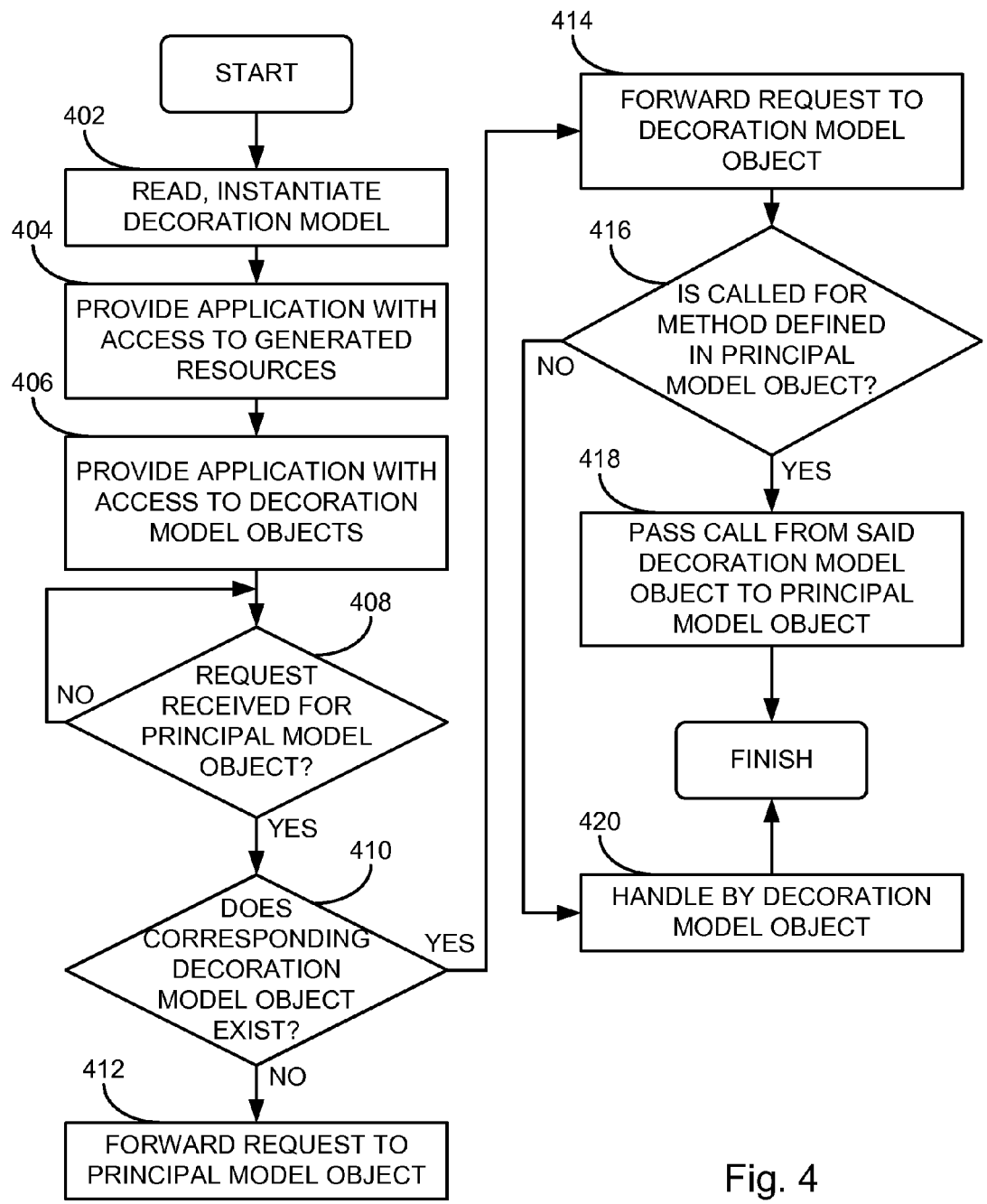
FIG. 4 is a simplified flowchart of an exemplary method of using a decoration model in an application environment, operative in accordance with an embodiment of the present invention.

Reference is now made to FIG. 4, which is a simplified flowchart of an exemplary method of using a decoration model in an application environment, operative in accordance with an embodiment of the present invention. In the method of FIG. 4, once model 100 of FIG. 1 has been prepared, and its principal model used to generate resources as described hereinabove, the decoration model is read from where it is stored and is instantiated for use by one or more computer-executable applications (steps 402, 404, 406), such as may be hosted by computer 114. When an application wishes to access an instance "EObject" of an item of the principal model (step 408), if the item has a corresponding item in the decoration model (step 410), the application accesses the corresponding instance "DObject" of the decoration model (step 414) instead of the "EObject" (step 412). Calls to methods that are defined in EObject (step 416) are passed through to EObject (step 418), while calls to methods that are defined in DObject are handled by DObject (step 420). For example, getRepresentation( ):String will return a representation based on which attribute is defined as "representation attribute" of the corresponding DObject's class in the decoration model.

Figure 5:
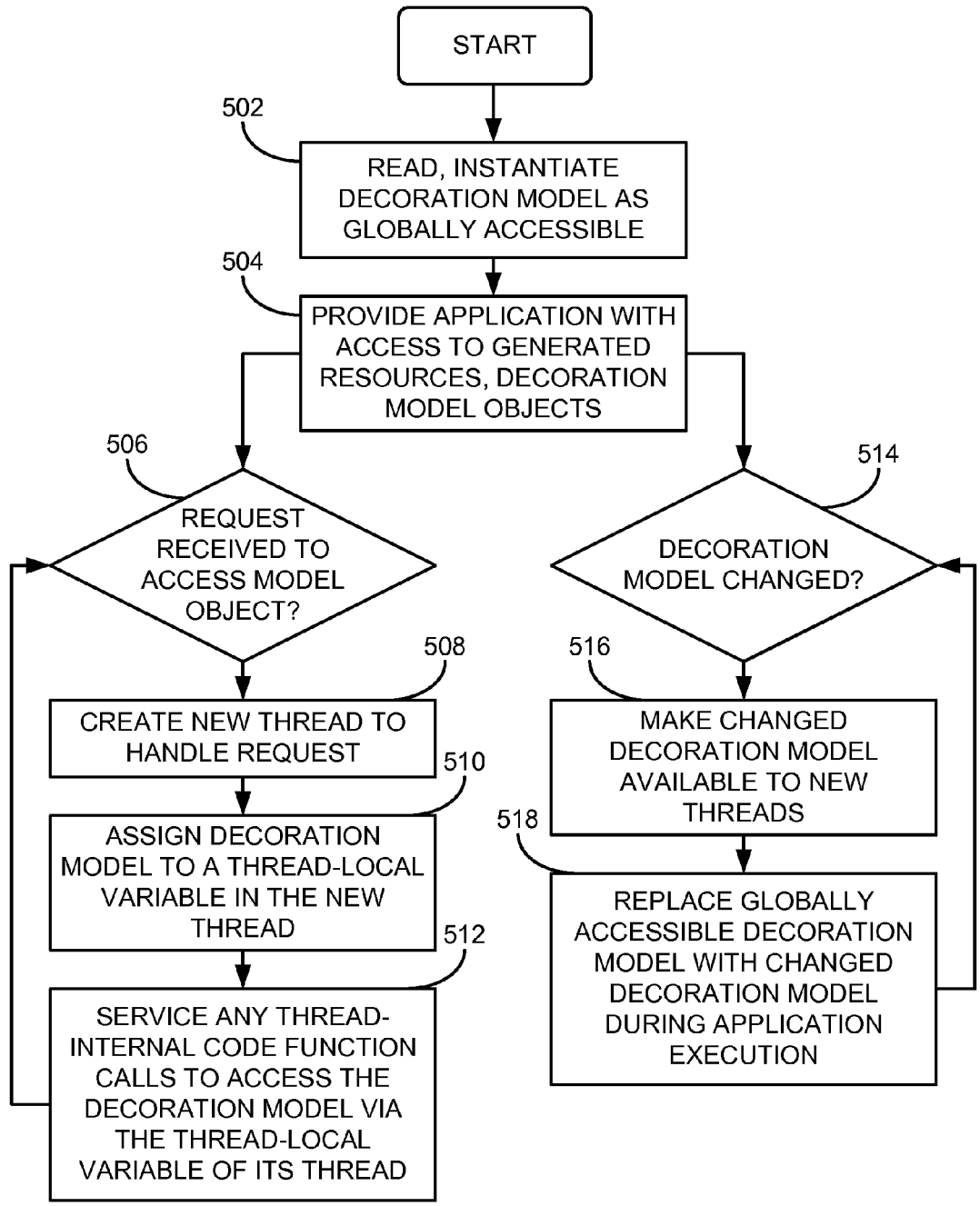
FIG. 5 is a simplified flowchart of an exemplary method of hot-deploying decoration model changes, operative in accordance with an embodiment of the present invention.

Reference is now made to FIG. 5, which is a simplified flowchart of an exemplary method of hot-deploying decoration model changes, operative in accordance with an embodiment of the present invention. In the method of FIG. 5, once model 100 of FIG. 1 has been prepared, and its principal model has been used to generate resources as described hereinabove, the decoration model is read from where it is stored and is instantiated for use by one or more computer-executable applications (step 502), such as may be hosted by computer 114. The instantiated decoration model is preferably made globally accessible (step 504). For each request by an application to access an object associated with either the principal model or the decoration model (step 506), a new thread is preferably created to handle the request (step 508). The decoration model is preferably assigned to a thread-local variable in the new thread (step 510), and all thread-internal code function calls to access the decoration model do so via the thread-local variable of its thread (step 512). Changes may be made to the decoration model (step 514) while applications that use the model are executed. The decoration model changes may be committed without impacting currently-running applications, since the previously-instantiated decoration model was globally accessible and was reused by all request threads prior to the changes being made. The changed decoration model may be made available to new threads by starting a new thread that reads the changed decoration model, instantiates the changed decoration model, and deserializes it into its own thread-local variable (step 516). This may be done without affecting other currently-running threads. The globally accessible decoration model may then be replaced by the changed model (step 518). This is preferably done using synchronization and isolation techniques, where new incoming requests are forced to wait until the globally accessible decoration model is replaced. Thereafter, all new requests will have the new decoration model assigned to their thread-local variable. Older requests that are still running using the old decoration model need not be disrupted, and may return and present results according to the older decoration model in their thread-local variable. Users may be warned when a model change occurs by checking for pointer equality between a thread-local variable and the globally accessible decoration model during the post-processing of a request. If the pointers are not the same, a warning may be displayed recommending that the user resubmit the request. If the server hosting the applications is restarted at any point after the decoration model is changed, the changed decoration model will preferably be in effect for all new and restarted applications.

Figure 6:
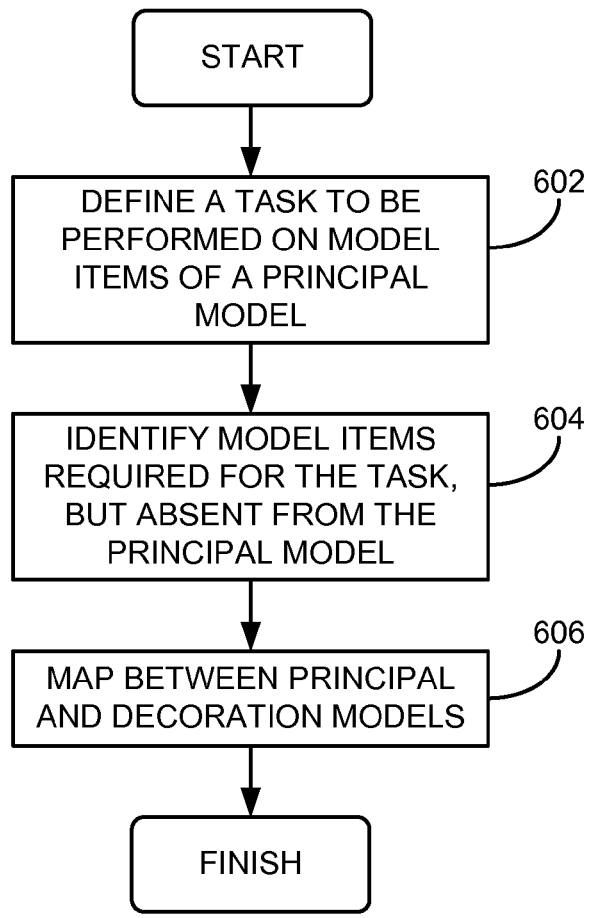
FIG. 6 is a simplified flowchart of an exemplary method of using a decoration model to augment a principal model, operative in accordance with an embodiment of the present invention.

Reference is now made to FIG. 6, which is a simplified flowchart of an exemplary method of using a decoration model to augment a principal model, operative in accordance with an embodiment of the present invention. In the method of FIG. 6, which may be implemented by model builder 102 in the context of the system of FIG. 1, a task to be performed on one or more model items of a principal model is defined (step 602). The task may be, for example, an impact analysis or a data lineage analysis. One or more model items that are required for the task, but that are not found in the principal model, are then identified (step 604). The identified model items are then defined in a decoration model, a mapping is made between the principal and decoration models, and the models are stored on a computer-readable medium (step 606), all as described hereinabove.

The application of the method of FIG. 6 to augment principal models may be further understood in the context of its application to several examples described hereinbelow with reference to FIGS. 8A-9E.

Figure 7:
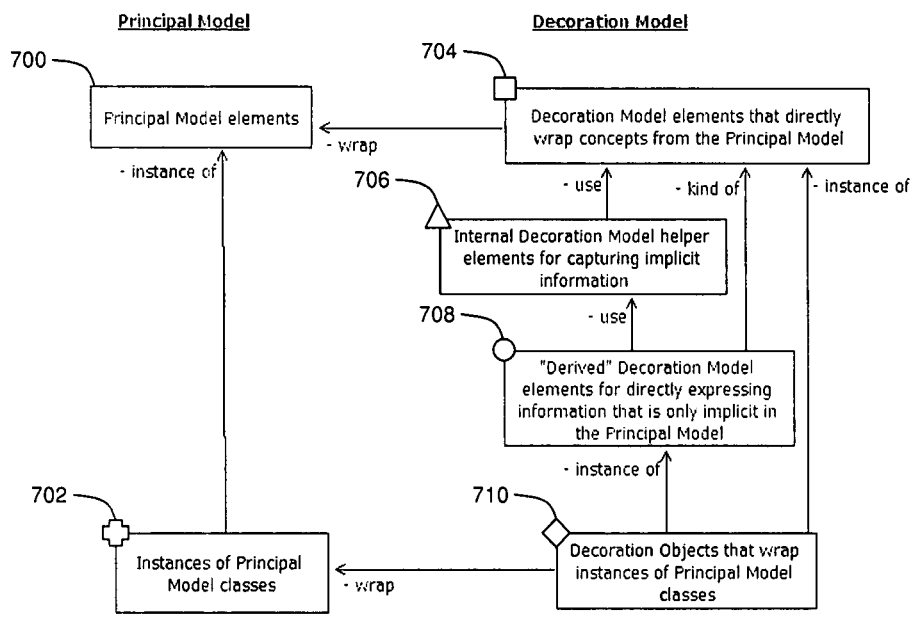
FIG. 7 is a simplified illustration of a model legend useful in understanding the present invention.

Reference is now made to FIG. 7, which is a simplified illustration of a model legend useful in understanding the present invention. In FIG. 7, a principal model item is shown having a plain border 700, while an instance of a principal model class is denoted by a border with a plus symbol 702. A decoration model item that directly corresponds to a principal model item is denoted by a border with a square symbol 704. A decoration model helper item is denoted by a border with a triangle symbol 706. A derived decoration model item that directly expresses information that is only implicit in the principal model is denoted by a border with a circle symbol 708. A decoration model object that corresponds to an instance of a principal model class is denoted by a border with a diamond symbol 710. Model items in FIGS. 8A-9E employ the border symbols shown in FIG. 7 to indicate which model item types are represented.

Figure 8A:
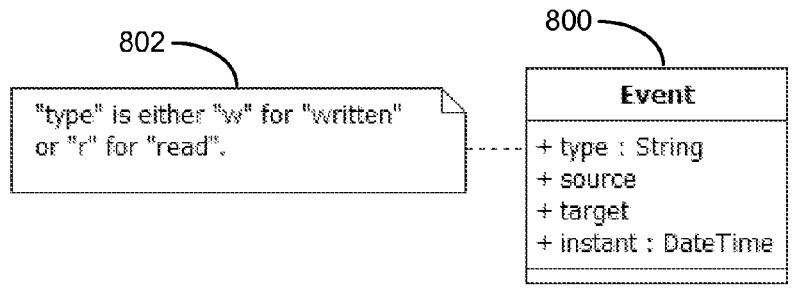
FIGS. 8A-8E are simplified illustrations of exemplary models useful in understanding the augmentation method of FIG. 6, operative in accordance with an embodiment of the present invention.
Figure 8B:
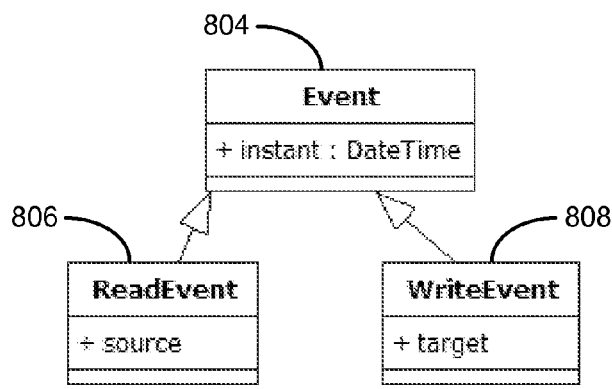
Figure 8C:
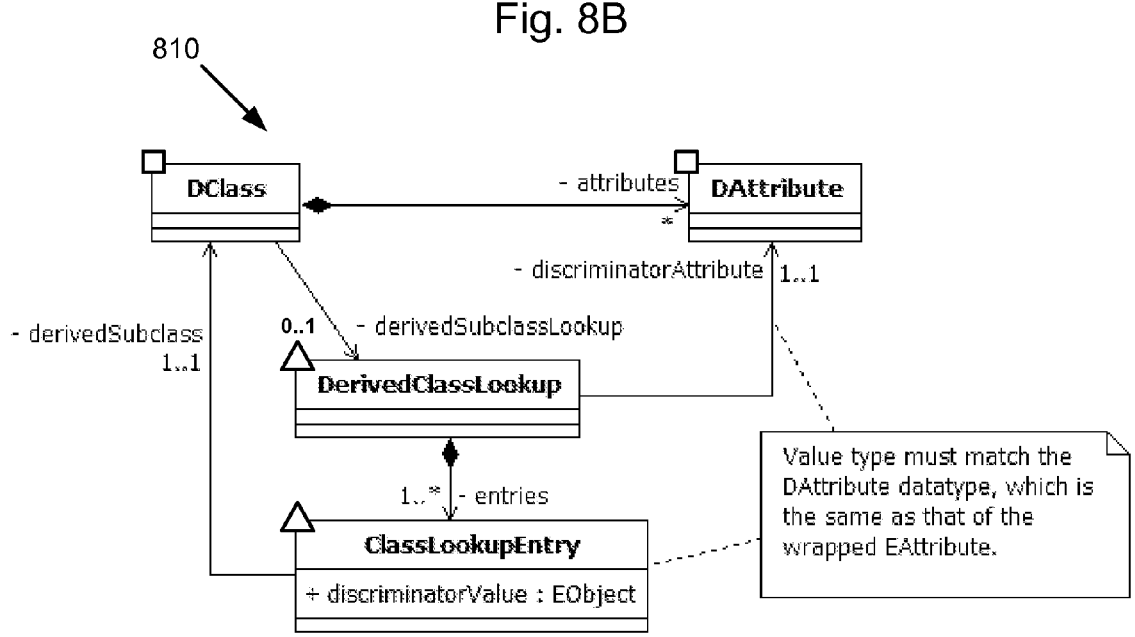

Reference is now made to FIGS. 8A-8E, which are simplified illustrations of exemplary models useful in understanding the augmentation method of FIG. 6, operative in accordance with an embodiment of the present invention. In FIG. 8A a flattened class hierarchy is shown where all subclasses of a class 800 may be stored in a single table by using a "type" discriminator attribute 802. This is done, for example, to allow queries regarding classes to be performed efficiently on a single table rather than on multiple tables storing multiple query types. However, given a task involving read events and/or write events within the model, a conceptually clearer model, and one that would allow for better analysis definition, may be represented by the static class model shown in FIG. 8B, where the subtype information of a class 804 is explicitly represented by separate subclasses 806 and 808. Using the method of FIG. 6, a decoration metamodel 810 shown in FIG. 8C may be used as a template for defining a decoration model 812 shown in a model object diagram in FIG. 8D in which a look-up may be performed of derived subclasses using a primitive attribute value. This approach may be used whenever more than one attribute is involved in determining a derived subclass. Thus, in the example shown in FIG. 8D, a new DClass instance is added per implicit subclass, being WriteEvent and ReadEvent, which are both subclasses of "Event." An instance of EventSubclassLookup is also added, being associated with DClass "Event." For each new subclass, an instance of ClassLookupEntry is added with an appropriate discriminatorValue.

Figure 8D:
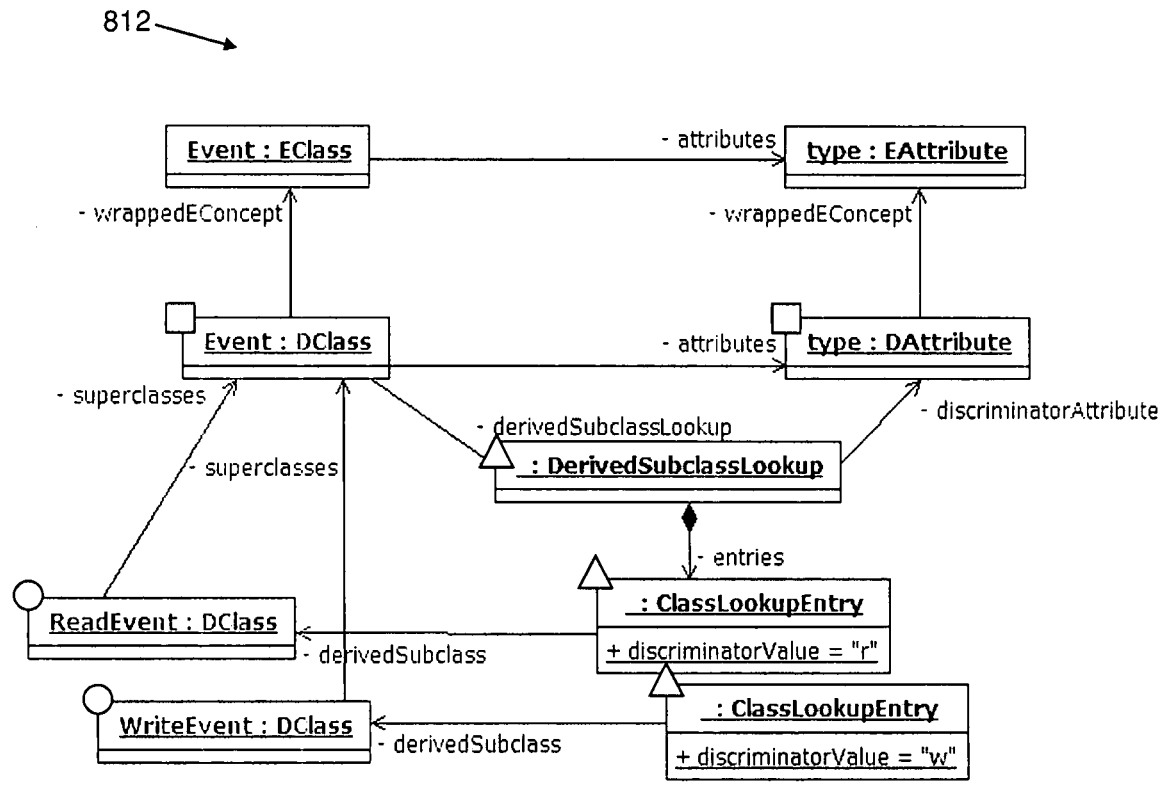
Figure 8E:
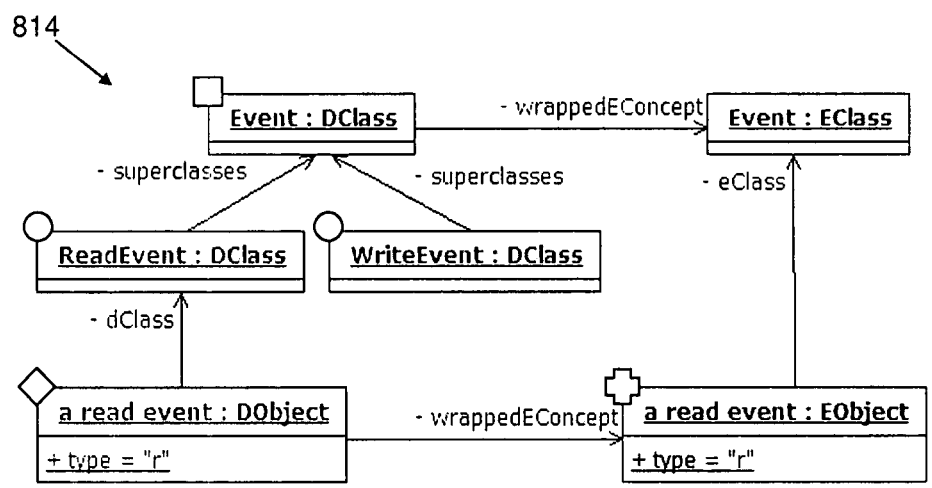

A sample instance-level object diagram 814 of the augmented model of FIG. 8D is shown in FIG. 8E. Once a principal model has been augmented by a decoration model as described above, read access of class instances may be provided in various ways. Read access may be provided for queries that are formatted for use with the decoration model and that are not directly operative on the principal model by translating them such that they may operate on instances of the principal model to retrieve the desired results. Thus, in the current example, a query for instances of WriteEvent in the decoration model may be translated into a query that may be performed on the EClass "Event" in the principal model where the value of the attribute type equals 'w.' Read access may also be provided for queries of instances of principal model classes such that they yield not only information that resides in the principal model, but may also provide related information that now resides in the decoration model. Thus, in the current example, read access of class instances may be provided as follows: When an EObject instance is loaded and mapped to a DObject, and the DClass has derived subclasses, then the "type" attribute value is examined and the DObject is assigned the appropriate derived subclass.

When setting values of instances of derived classes, references, or attributes, the values may be translated to values that may be stored in the principal model and that retain their meaning when the instances are subsequently retrieved via the decoration model. Thus, in the current example, write access may be provided as follows: When an object is created via the decoration layer, and the object class is a derived subclass, then the "type" attribute value is set according to the subclass lookup value. Where this type attribute value is persisted with the principal model persistent schema, the next time this object is loaded into memory, the read access logic above will ensure that the object is assigned the appropriate derived subclass.

It is appreciated that the GUI definitions described hereinabove with reference to FIGS. 1-5 can be defined for any DClass, including derived subclasses. Thus, in the example shown in FIG. 8E:

1. The display names and icons may be different for ReadEvents and WriteEvents.
2. The reference "target" may be hidden in ReadEvent, and "source" may be hidden in WriteEvent, since they are not applicable there.
3. The attribute "type" may be hidden in both ReadEvent and WriteEvent, since type information is already explicit in the class name.

Figure 9A:
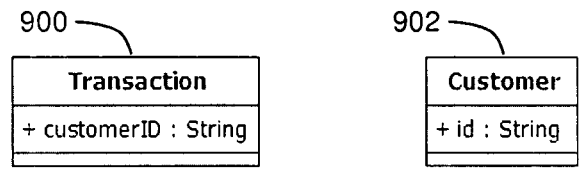
FIGS. 9A-9E are simplified illustrations of exemplary models useful in understanding the augmentation method of FIG. 6, operative in accordance with an embodiment of the present invention.
Figure 9B:
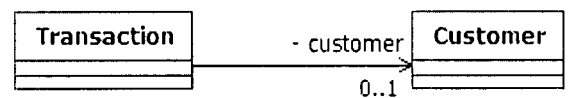
Figure 9C:
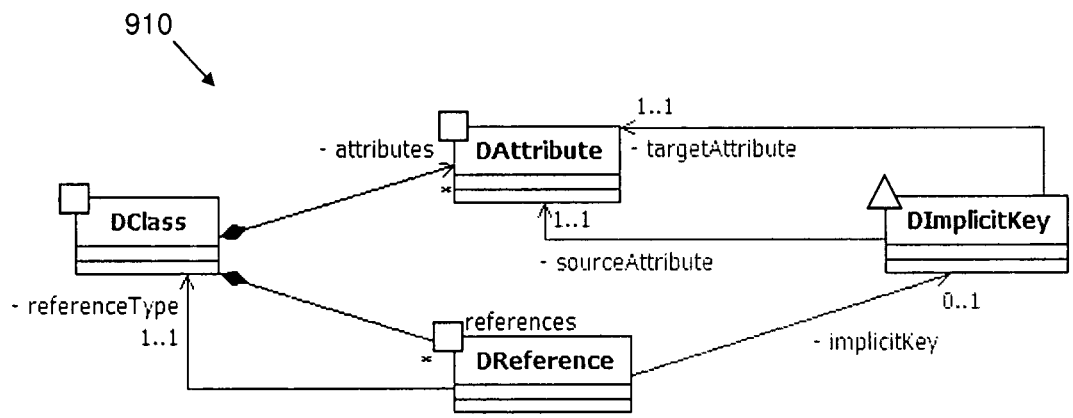

Reference is now made to FIGS. 9A-9D, which are simplified illustrations of exemplary models useful in understanding the augmentation method of FIG. 6, operative in accordance with an embodiment of the present invention. In FIG. 9A a model is shown where an association between two classes 900 and 902 is not expressed using an association model item. Thus, in the example shown, there is no modeled association between a customer and transactions involving the customer. This is done, for example, so that inserting, editing and removing references within the model may be carried out quickly, without involving any checks or locks in the database and/or the Object/Relational Mapping (ORM) level. Thus, given a task involving the relationship between customers and transactions, the model may be represented as shown in FIG. 9B, where the association is explicitly represented. Using the method of FIG. 6, a decoration metamodel 910 shown in FIG. 9C may be used as a template for defining a decoration model 912 shown in a model object diagram in FIG. 9D in which a "derived DReference" may be created and associated with a DImplicitKey, which contains information about the source and the target DAttribute of the key. This is similar to the concept of a Foreign Key in a database. However, there is no need for DImplicitKey to reference the type class, since this is already done by DReference.

Figure 9D:
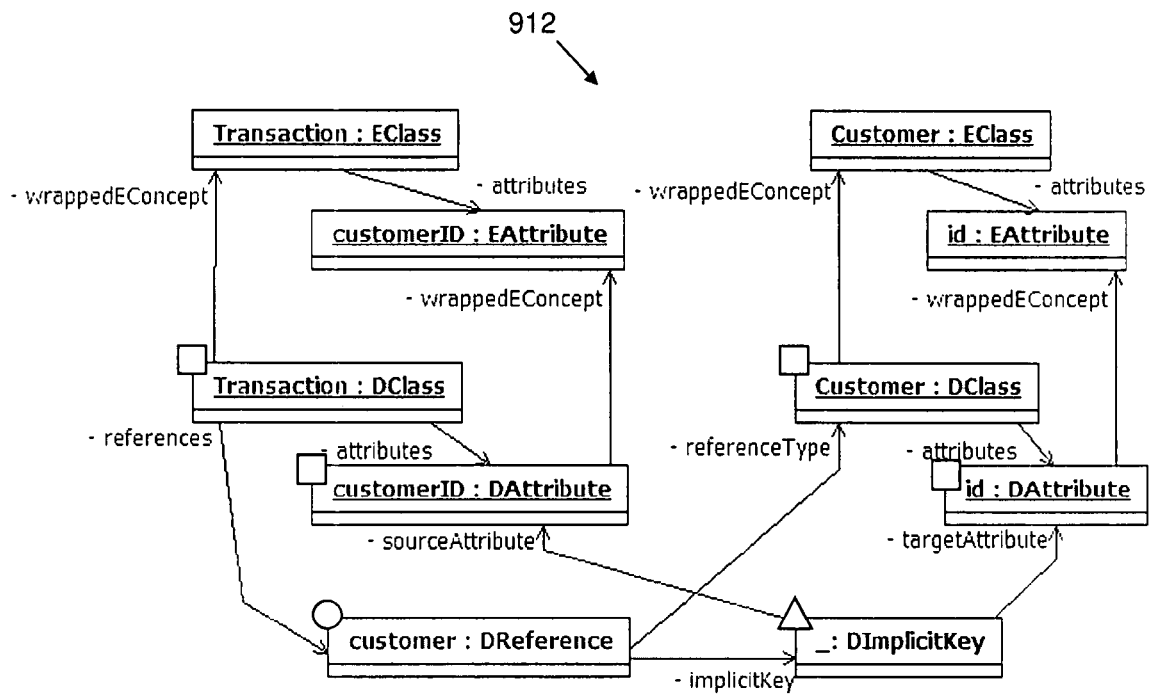
Figure 9E:
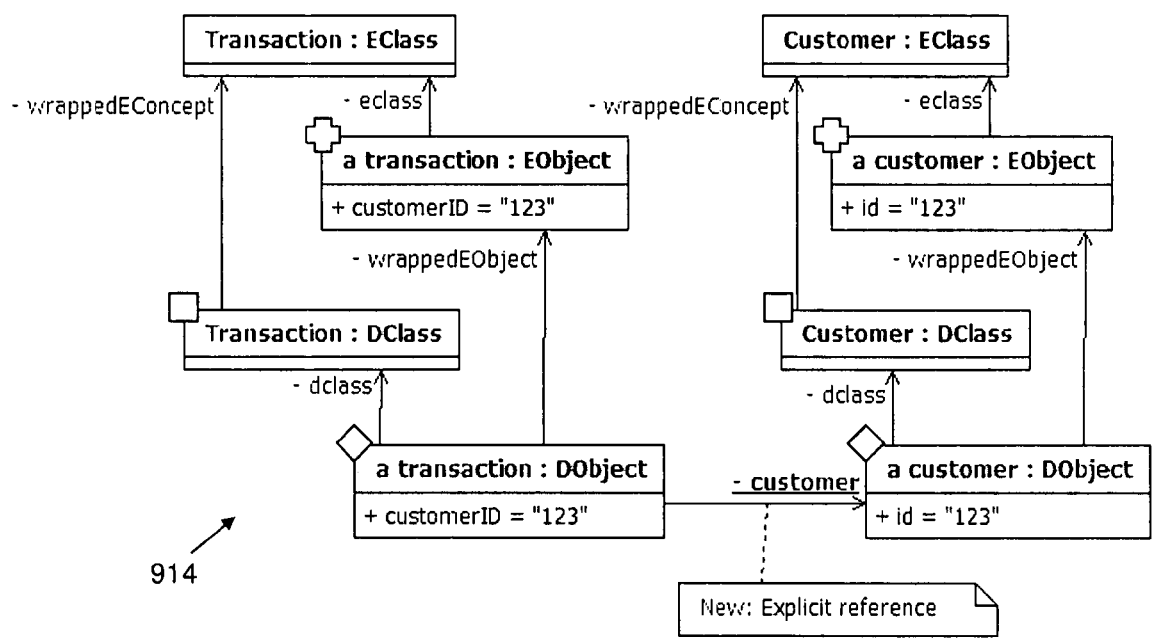

A sample instance-level object diagram 914 of the augmented model of FIG. 9D is shown in FIG. 9E. Read access may be provided as follows: When the value for a derived reference is requested by clients of the decoration layer, the object that is implicitly referenced by the key attribute is returned. Once retrieved, the reference value can be cached. Services and GUI clients on top of the decoration layer "see" the derived reference value transparently, although derived reference values may be marked as such in the GUI layer. Write access may be provided as follows: When the values for a derived reference are set by clients of the decoration layer, the respective source key attribute (e.g., customerID) value of the source object (e.g., transaction) is set to the target key attribute (e.g., id) value of the target object (e.g., customer). When the persistence layer subsequently saves the source object, it will contain the correct new key attribute value, which will cause the correct new target object to be retrieved next time the source object is loaded into memory. Decoration GUI definitions may be set to hide the attribute "customerID" in DClass "Transaction" and the attribute "id" in DClass "Customer", since this information is now explicitly expressed by reference "customer".

Any of the elements and steps described hereinabove are preferably executed by or otherwise accessible to computer 114 (FIG. 1) having been configured for such purpose.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for augmenting a model in a model-driven application development architecture, the method comprising:
    defining a task to be performed on at least one model item of a principal model, wherein said principal model is configured to facilitate automatic generation of at least one resource for use by a computer-executable application and comprises a plurality of classes, references, attributes, and associations between any of said classes;
    identifying at least one model item required for said task that is absent from said principal model;
    instantiating said absent model item in a decoration model that operates with the principal model to augment operational functionality of the principal model, where the decoration model comprises a class, a reference, and an attribute for any corresponding one of said plurality of classes, references, and attributes of the principal model;
    mapping said decoration model to said principal model, where the operational functionality of the principal model is augmented by the instantiated model item within the decoration model; and
    storing both of said models on a computer-readable medium.

2. The method according to claim 1, wherein said identifying step comprises:
    identifying at least one class in said principal model that can be subdivided into one or more subclasses;
    identifying in said class an attribute that distinguishes identities of each of said subclasses; and
    declaring a lookup table mapping values of said attribute to said identities of said subclasses.

3. The method according to claim 2, further comprising:
    identifying a flattened class hierarchy in said principal model where all subclasses of any classes in said flattened class hierarchy are stored in a single table using a "type" discriminator attribute; and
    representing any of said classes in a static class model in said decoration model where subtype information of any of said classes is explicitly represented by separate subclasses in said decoration model.

4. The method according to claim 3, further comprising performing a look-up of derived subclasses in said decoration model by using a primitive attribute value where more than one attribute is involved in determining a derived subclass.

5. The method according to claim 3, further comprising providing read access for a query that is formatted for use with said decoration model and that is not directly operative on said principal mode by translating said query for operation on an instance of said principal model.

6. The method according to claim 3, further comprising providing read access for a query that is formatted for use with at least one class of said principal model, wherein said query yields information that resides in both said principal model and said decoration model.

7. The method according to claim 3, further comprising setting values of instances of any of classes, references, or attributes of said decoration model by translating said setting values for storage in said principal model, wherein said setting values retain their meaning when said instances are subsequently retrieved via said decoration model.

8. The method according to claim 3, further comprising providing write access for an object that is created via said decoration model, using a class that is a derived subclass, by setting a "type" attribute value according to a subclass lookup value, wherein said type attribute value is persisted with persistent schema of said principal model such that when said object is subsequently accessed, said object is assigned to the derived subclass.

9. The method according to claim 1, further comprising:
    identifying at least two classes in said principal model where an association between said classes is not expressed using an association model item; and
    representing said association in said decoration model.

10. The method according to claim 9, wherein said representing step comprises creating a reference associated with a key that contains information about a source attribute and a target attribute of said key in said decoration model.

11. A system for augmenting a model in a model-driven application development architecture, comprising:
    a memory; and
    a processor programmed to:
        define a task to be performed on at least one model item of a principal model, wherein said principal model is configured to facilitate automatic generation of at least one resource for use by a computer-executable application and comprises a plurality of classes, references, attributes, and associations between any of said classes;
        identify at least one model item required for said task that is absent from said principal model;
        instantiate said absent model item in a decoration model that operates with the principal model to augment operational functionality of the principal model, where the decoration model comprises a class, a reference, and an attribute for any corresponding one of said plurality of classes, references, and attributes of the principal model;

map said decoration model to said principal model, where the operational functionality of the principal model is augmented by the instantiated model item within the decoration model; and store both of said models within the memory.

12. The system according to claim 11, where in being programmed to identify the at least one model item required for said task that is absent from said principal model, the processor is programmed to:

identify at least one class in said principal model that can be subdivided into one or more subclasses;

identify in said class an attribute that distinguishes identities of each of said subclasses; and declare a lookup table mapping values of said attribute to said identities of said subclasses.

13. The system according to claim 12, where the processor is further programmed to:

identify a flattened class hierarchy in said principal model where all subclasses of any classes in said flattened class hierarchy are stored in a single table using a "type" discriminator attribute; and represent any of said classes in a static class model in said decoration model where subtype information of any of said classes is explicitly represented by separate subclasses in said decoration model.

14. The system according to claim 13, where the processor is further programmed to perform a look-up of derived subclasses in said decoration model by using a primitive attribute value where more than one attribute is involved in determining a derived subclass.

15. The system according to claim 13, where the processor is further programmed to provide read access for a query that is formatted for use with said decoration model and that is not directly operative on said principal mode by translating said query for operation on an instance of said principal model.

16. The system according to claim 13, where the processor is further programmed to provide read access for a query that is formatted for use with at least one class of said principal model, wherein said query yields information that resides in both said principal model and said decoration model.

17. The system according to claim 13, where the processor is further programmed to set values of instances of any of classes, references, or attributes of said decoration model by translating said setting values for storage in said principal model, wherein said setting values retain their meaning when said instances are subsequently retrieved via said decoration model.

18. The system according to claim 13, where the processor is further programmed to provide write access for an object that is created via said decoration model, using a class that is a derived subclass, by setting a "type" attribute value according to a subclass lookup value, wherein said type attribute value is persisted with persistent schema of said principal model such that when said object is subsequently accessed, said object is assigned to the derived subclass.

19. The system according to claim 11, where the processor is further programmed to:

identify at least two classes in said principal model where an association between said classes is not expressed using an association model item; and represent said association in said decoration model.

20. The system according to claim 19, where in being programmed to represent said association in said decoration model, the processor is programmed to create a reference associated with a key that contains information about a source attribute and a target attribute of said key in said decoration model.

* * * * *